United States Patent Office 3,520,566
Patented July 14, 1970

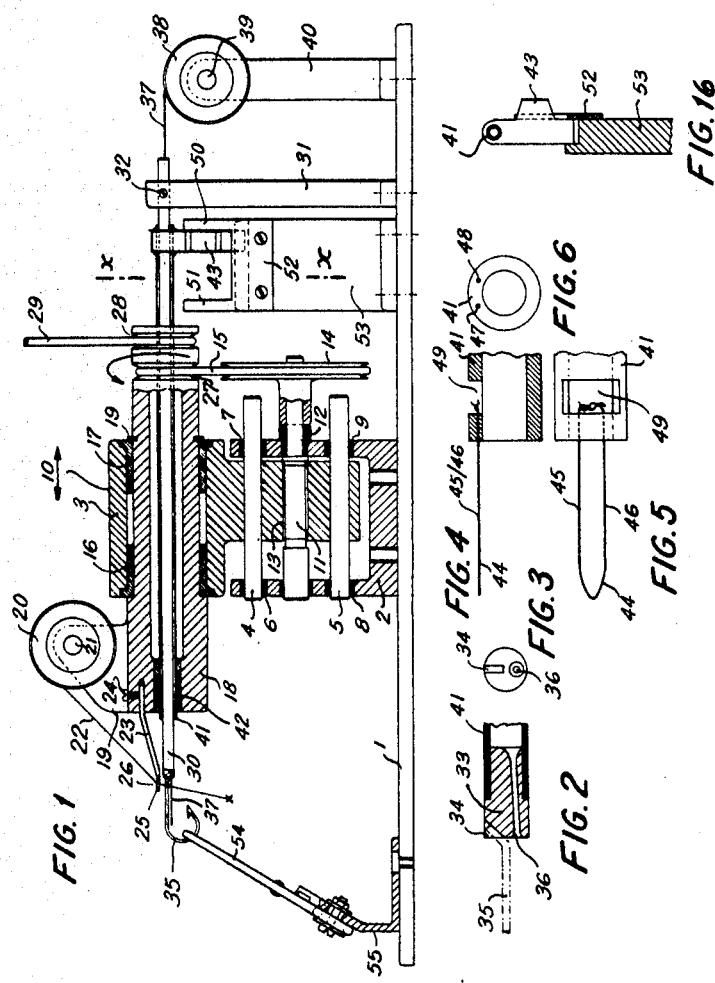

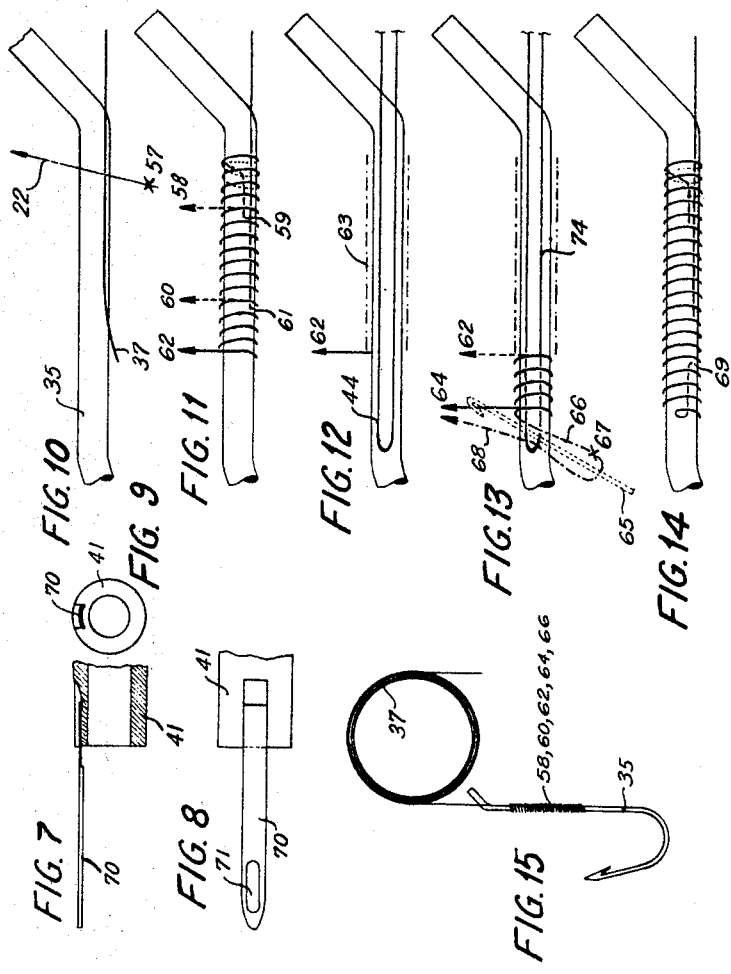

3,520,566
MACHINE FOR TYING FISHING HOOKS
Marcel Bovigny, 2 Rue Battoirs,
1205 Geneva, Switzerland
Filed Oct. 28, 1968, Ser. No. 771,137
Claims priority, application Switzerland, Oct. 28, 1967,
15,162/67
Int. Cl. B65h 69/04
U.S. Cl. 289—17                                    7 Claims

ABSTRACT OF THE DISCLOSURE

A machine is provided for tying fishhooks wherein a stationary central bar holds both the hook and a leader line while an eccentrically mounted thread guide is rotationally and reciprocally driven to coil a tie wire about both the hook and leader line. A closing mechanism is also provided to complete the tying operation.

The present invention resides in a machine for tying hooks.

The accompanying drawing represents by way of example one embodiment of the machine and includes figures showing its operation.

FIG. 1 is a partial cross section of the machine.

FIGS. 2 and 3 show details of a bar mechanism of the machine.

FIGS. 4, 5 and 6 show details of a tube mechanism of the machine.

FIGS. 7, 8 and 9 show a modification of the tube mechanism.

FIGS. 10 to 14 illustrate the formation of the tie.

FIG. 15 shows a tied hook.

FIG. 16 is a cross sectional view along X—X of FIG. 1.

There is shown in FIG. 1 a base 1 on which is secured a headstock support 2. A headstock 3 comprises two parallel shafts 4 and 5 which are slidably mounted in blocks 6, 7, 8 and 9 integral with the stock support 2.

The stock 3 is positioned to undergo a reciprocating movement in the direction of arrow 10. This movement is controlled by a main screw 11 maintained axially in the support of stock 2 by a ring 12 and engaged in a tapping 13 of the stock 3. The rotation of the main screw 11 is effected by means of a pulley 14 driven by a belt 15. The stock 3 comprises two bearings 16 and 17 forming a support for a spool 18. A shoulder 19 ensures that the stock 3 cannot move axially relative to the spool 18 and on the spool 18 is secured a spool of tie wire 20 movable around a shaft 21 and on which is wound the tie or binding wire 22.

A guide wire 23 is eccentrically secured to the spool 18 by means of a screw 24 and the guide wire comprises a break 25 having therein an opening 26 for the passage of the tie wire 22.

The spool 18 includes on one end thereof a pulley 27 driving a belt 15 and a pulley 28 driven by a motor, not shown, by means of a belt 29.

Along the longitudinal axis of the spool 18 is mounted a central bar 30 secured in a column 31 by means of a screw 32. The central bar 30 is constituted by a tube having a head 33 (FIGS. 2 and 3) comprising an adjusting recess 34 for receiving therein a hook 35 and a hole 36 for the passage of an end of a linking thread 37 which is wound on a spool 38 movable around a shaft 39 secured to a foot 40.

The central bar 30 is surrounded by a tube 41 which is axially movable relative to the bar and centred in a block 42 fast of the support shaft of spool 18. A handle 43 is fastened on tube 41 for effecting movement of the tube 41.

The left hand extremity of tube 41 near hook 35 comprises an eyelet 44 (FIGS. 4, 5 and 6) constituted by a loop of thread secured to tube 41. Two branches 45 and 46 of the loop pass in two holes 47 and 48 in tube 41 and are knotted in a notch 49 of said tube 41.

Tube 41, eyelet 44 and handle 43 constitute the closing mechanism for the tie.

The tube 41 can move axially between two stops 50 and 51 of a plate 52 which is fast on a support 53 secured on the base 1 (FIG. 16).

Hook 35 is positioned in recess 34 and maintained in place by means of a clamp 54 secured to a strap 55. Clamp 54 can be moved and adjusted on strap 55. Strap 55 can be moved and adjusted on base 1 which makes it possible to vary the position of clamp 54 in proportion to the length of hook 35.

Belt 29 drives the spool 18 in the direction of arrow 56.

The operation of the described machine is as follows: The machine being stopped, the various elements occupy the rest position indicated in FIG. 1. Hook 35 is introduced in recess 34 and maintained therein by clamp 54. The end of the linking thread 37 is pulled along hook 35 and the thread of the tie 22 is held manually in front of hook 35 by its end 57 (FIGS. 1 and 10).

Upon energization of the motor, the spool 18 turns in the direction of arrow 56 driving the guide screw 11 through pulleys 27 and 14 and through belt 15. Stock 3 moves to the left and the rotating spool 18 effects a helical movement of the beak 25 of guide wire 23. The tie wire or thread 22 winds on hook 35 and encloses the free end 57 of the tie line 22.

The machine is stopped when the tie line 22 occupies position 58 (FIG. 11). The free end of the tie line is cut at 59 (FIG. 11).

The machine is then restarted and operated until the tie line 22 is wound up to position 60 (FIG. 11).

The machine is again stopped and the linking wire is cut at 61 (FIG. 11).

Then the machine is again started and the tie line 22 is wound up to the position indicated by 62 (FIG. 11).

The machine is then again stopped, after which the closing mechanism is moved to the left by means of handle 43. The eyelet 44 advances on hook 35 over coils 63 of the tie line 22 (FIG. 12).

The machine is then started for the last time and the tie line 22 winds on eyelet 44 up to position 64 (FIG. 13).

The machine is finally stopped and by means of a hook 65 passed in eyelet 44, the thread 64 is hooked and the hook 65 is withdrawn in order that the tie line assumes the position indicated by the dotted line 66 (FIG. 13). The tie line is then cut at 67 and the free end 68 of the tie line is taken out of eyelet 44.

The closing mechanism is then moved to the right whereby the eyelet 44 pulls the strand of the tie line 66, which passes under the last coils of the tie, and escapes through eyelet 44. It is then cut at 69 (FIG. 14) and the tie is finished.

The hook is then freed from clamp 64 and pulled to the left by acting on the connecting thread 37. The same is cut to the desired length, generally 60 to 80 cm., to form a leader.

The working of the hook 65 and the different cuts of threads of tie 22 and of the linking link 37 are effected manually.

The resulting product is a mounted hook according to FIG. 15 comprising a hook 35, binding 58, 60, 62, 64 and 66 and the connecting thread 37.

The direction of the motor is reversed to return the stock 3 into its initial position (FIG. 1).

There is shown in FIGS. 7, 8 and 9 a closing eyelet constituted by a small tongue 70 having therein an opening 71 for the passage of the tie thread 22 and hook 65. The cross section of the small tongue 70 is a part of a circumference to espouse the cylindrical shape of the tie.

The small tongue 70 is secured to tube 41 by means not shown.

During operation of the machine, the beak 25 of guide wire 23 moves as close as possible to hook 35 but leaves sufficient clearance therebetween for the passage of the closing eyelet 44/70.

The finished binding is then coated with special glue.

The spool of binding 20 and the spool of linking thread 38 include adjustable brakes for adjusting the tension on the threads.

The driving motor of the machine will preferably be controlled by means of a pedal switch so as to allow the worker free use of his hands.

What is claimed is:

1. Machine for tying hooks comprising a central bar having a longitudinal passage for receiving the extremity of a linking thread and an adjusting recess dimensioned to receive a hook; a clamp for clamping said hook in said recess; a rotatably mounted spool; a spool of binding thread mounted on said rotatably mounted spool; guide means eccentrically mounted on said rotatably mounted spool for helically guiding and coiling said binding thread around both said hook and said linking thread when said hook is clamped in said recess; drive means for rotationally and reciprocally driving said rotatably mounted spool; and a closing mechanism for closing said binding comprising an axially movable eyelet for pulling the free extremity of said binding thread under the coils of thread surrounding said hook.

2. Machine according to claim 1, wherein said central bar is fixed and consists of a cylindrical tube comprising a head portion having an opening therein for the passage of linking thread and said recess for said hook.

3. Machine according to claim 1, wherein said closing mechanism comprises a tube slidably mounted on said central bar and to which is secured a member in the shape of an eyelet.

4. Machine according to claim 3, wherein said member in the shape of an eyelet is constituted by a thread forming a loop.

5. Machine according to claim 3, wherein said member in the shape of an eyelet is constituted by a pierced tongue.

6. Machine according to claim 1, wherein said guide comprises a beak located near said central bar.

7. Machine according to claim 1, wherein said drive means includes a reciprocally mounted headstock, said rotatably mounted spool is rotatably mounted in said head stock and axially fixed relative thereto, and screw means for effecting reciprocal movement of said head stock.

References Cited
UNITED STATES PATENTS

| | | | |
|---|---|---|---|
| 465,894 | 12/1891 | Stone | 289—17 |
| 3,043,615 | 7/1962 | Donnebaum | 289—17 |
| 3,265,422 | 8/1966 | Pierce | 289—17 |

LOUIS K. RIMRODT, Primary Examiner